(No Model.) 2 Sheets—Sheet 1.

E. O. McGLAUFLIN.
CABLE RAILROAD.

No. 359,802. Patented Mar. 22, 1887.

Witnesses
R. H. Sanford.
A. M. Gackell

Inventor
Eugene O. McGlauflin
By A. C. Paul,
Atty.

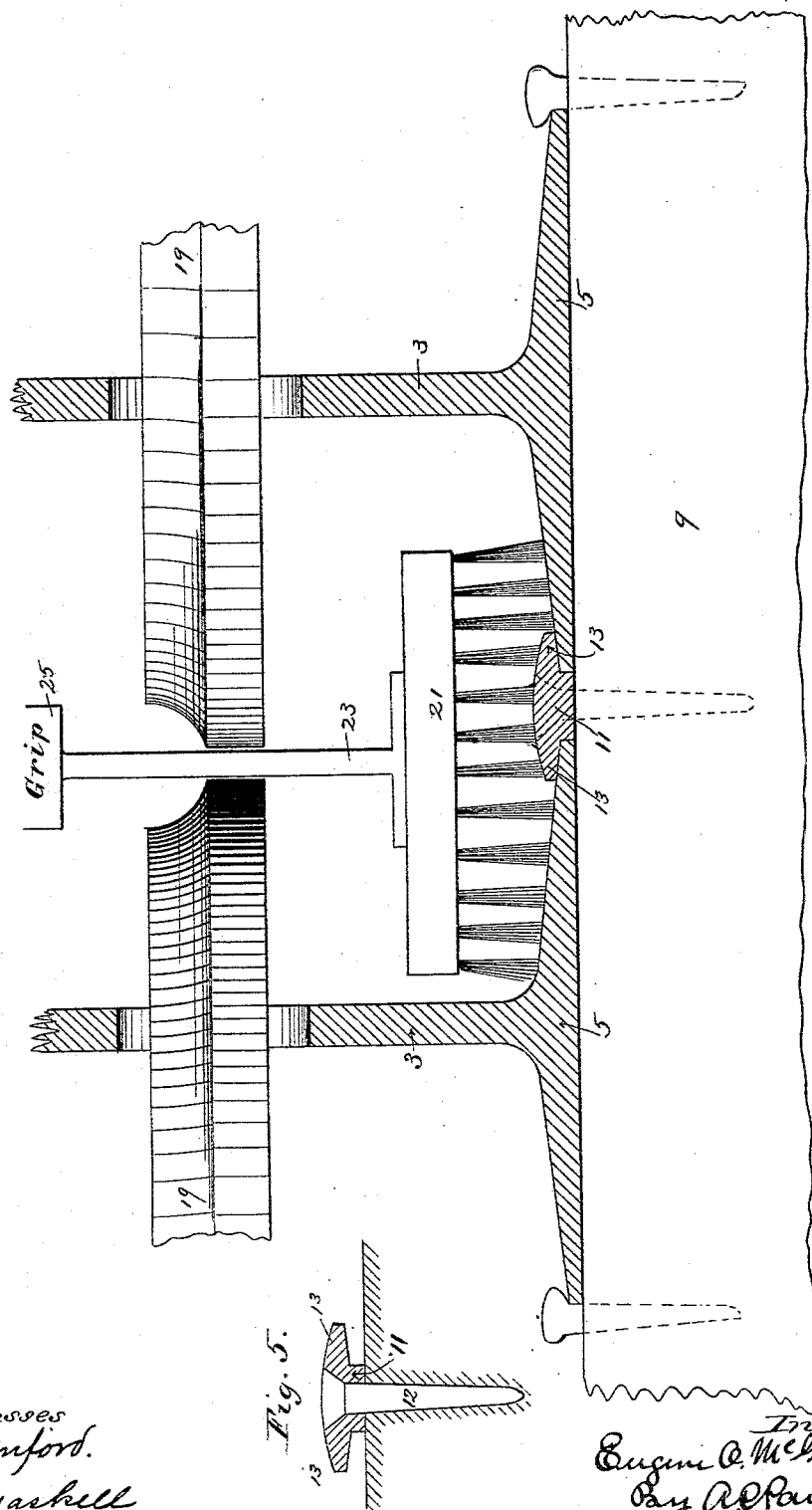

UNITED STATES PATENT OFFICE.

EUGENE O. McGLAUFLIN, OF MINNEAPOLIS, MINNESOTA, ASSIGNOR OF ONE-HALF TO WILLIAM McCRORY, OF SAME PLACE.

CABLE RAILROAD.

SPECIFICATION forming part of Letters Patent No. 359,802, dated March 22, 1887.

Application filed November 16, 1886. Serial No. 218,999. (No model.)

*To all whom it may concern:*

Be it known that I, EUGENE O. MCGLAUFLIN, of Minneapolis, in the county of Hennepin and State of Minnesota, have invented certain Improvements in Cable Roads, of which the following is a specification.

This invention relates to improvements in that class of railroads that are commonly designated as "cable roads," the cars being propelled by means of a cable that runs in a conduit below the surface of the road. One of the principal objections to these roads arises from the great expense of the conduit, which is usually of large size, having the cable-supporting sheaves mounted in it, and requiring to be placed in an excavation of considerable depth.

One object of my invention is to provide an inexpensive conduit of suitable size to receive the cable and grip, while the sheaves are placed in chambers upon either side of the conduit, and project into it through openings in its walls. Such a conduit can be laid without making a large excavation.

Another object of the invention is to provide means for keeping the conduit clear of dust, dirt, snow, ice, or other material.

Other objects of the invention will appear from the following detailed description.

Figure 1:
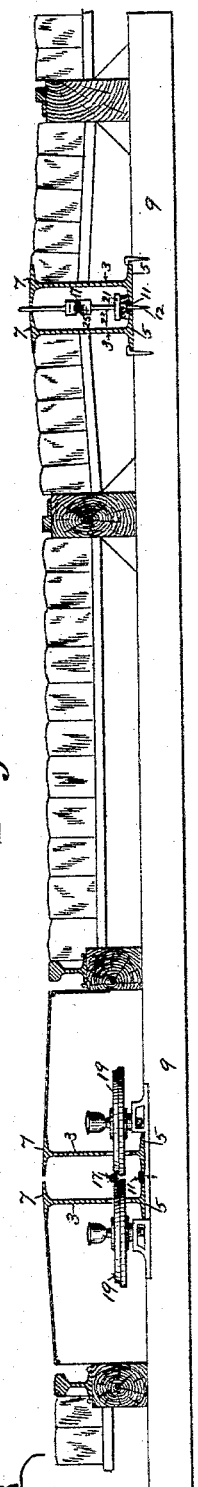
Figure 2:
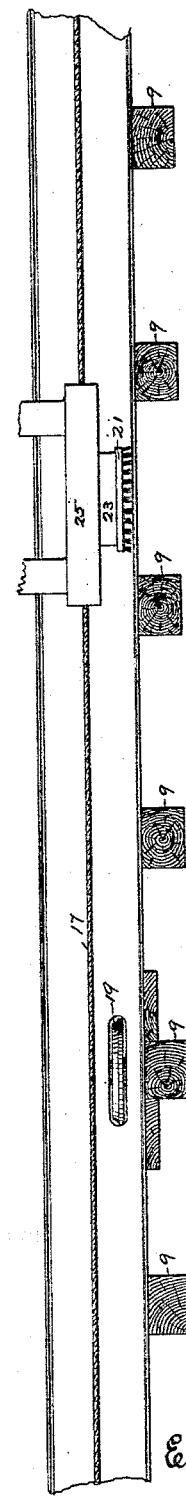
Figure 4:
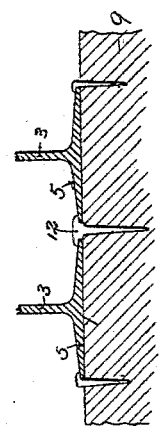

In the accompanying drawings, forming a part of this specification, Figure 1 is a cross-section of a cable road, showing a double track, two of the conduits, and means for cleaning them. Fig. 2 is a longitudinal section through one of the conduits, showing the means for cleaning the same. Fig. 3 is a partial cross-section of a conduit on a large scale, showing also the means for cleaning it. Fig. 4 is a detail of a modification. Fig. 5 is a detail of the spacing-plate.

In Fig. 1 of the drawings I have shown the tracks of a cable road, each track being provided with a conduit in which the cable is carried upon suitable supporting-sheaves.

The conduit is formed of two channel-irons or I-beams, 3, each provided with a horizontal flange, 5, upon each side at the bottom, and with a corresponding flange, 7, at the top. The flanges at the top and bottom are preferably of substantially the same width. These beams are placed together side by side, forming a small conduit or tube.

The manner of securing the beams is preferably as follows: Suitable ties or timbers, 9, are placed upon the ground at suitable distances apart. A spacing and securing plate, 11, is then secured to these timbers at the point desired for the center of the track by spikes 12. The plate 11 has upon each side a projecting flange, 13, and its upper surface is preferably rounded off, as shown in the drawings. After the plane 11 is spiked in place the I-beams are placed against it upon each side, with their flanges projecting under the flanges 13 of the plate. The outer lower flanges of the beams are then secured to the timbers by suitable spikes. A suitable space is left between the upper flanges to admit the shank of the grip into the conduit. This space will be equal to the width of the spacing-plate 11, exclusive of its flanges, when the upper and lower flanges of the I-beams are of the same width. I do not, however, restrict myself to the use of beams having flanges of equal width, as the lower flanges may be of greater or less width than the upper ones, the beams being placed at a suitable distance apart to provide suitable space between the upper flanges for the passage of the grip; nor do I restrict myself to any particular shape of I-beams or channel-irons, as any beams or irons may be used that will, when placed together, form a suitable tube or conduit.

The central spacing-plate may be of any suitable shape, and in some instances, where it is not important that the bottom of the conduit be tight and smooth, the spacing-plate may be omitted and the beams be secured by spikes 12, having flanged heads that will project in both directions over the flanges of the beams, as shown in Fig. 4.

The cable 17 is supported upon sheaves 19, that project into the conduit through slots in its walls. These sheaves are claimed by me in a former patent, and I do not claim the same broadly herein.

The top flanges of the I-beams are preferably inclined away from the opening into the conduit, so as to cause the water that falls on them to run away from the opening. The conduit may also be used for electric railroads, or for other purposes for which it is adapted. Each I-beam or channel-iron may be rolled out in one piece, or it may be formed of independent pieces secured together by suitable means.

I prefer to provide means by which the dust, dirt, snow, ice, or other material that falls into the conduit may be swept along therein until it falls into suitable pits or openings designed for its reception.

The sheaves are arranged with a narrow space between them. A brush, 21, is placed in the conduit below the sheaves, and is secured by a suitable support, 23, to the cable-grip 25. This brush is of suitable size to extend across or nearly across the tube, and the support 23, by which it is secured to the grip, may be formed of suitable flexible material, as sole-leather, or may be provided with suitable joints, to allow freedom of movement of the brush. A suitable scraper may be substituted for the brush.

No claim is made to the construction of the grip, as the brush may be applied to any suitable grip. As the grip passes along the conduit, it raises the cable from the sheaves, and the brush is moved along in the conduit, sweeping the dust and dirt along therein until it falls into a suitable pit below the bottom of the conduit. The brush-support is of suitable size to pass between the sheaves, as shown in Figs. 2 and 3.

Instead of utilizing the grip to support the brush, it may be supported in any suitable way upon the car, and may be used with any car or conduit for which it is adapted.

I claim as my invention—

1. A tube or conduit for cable roads, comprising channel-irons or I-beams arranged with a narrow space between their upper edges, and spacing and securing means, substantially as described, between their inner lower flanges.

2. The tube or conduit for cable roads, comprising the channel-irons or I-beams and the flanged spacing and securing plate, secured over and between their inner lower flanges, substantially as described.

3. In a cable road, the combination, with the conduit and supporting-sheaves, of a brush secured to a support that moves with the car and arranged to pass below the sheaves and sweep the bottom of the conduit as the car is moved over the road.

4. In a cable road, the combination, with the conduit, the supporting-sheaves, and cable-grip, of a brush secured to said grip and arranged to pass below the sheaves and sweep the bottom of the conduit as the grip moves along therein, substantially as described.

5. The combination, in a cable road, with the conduit having openings in its walls, of the cable-supporting sheaves projecting into said conduit through said openings, the cable, the grip, and a brush secured to said grip and adapted to sweep the bottom of the conduit, substantially as described.

6. The combination, with the horizontal sheaves arranged with a space between them, of the grip, the brush, and the brush-support secured to said grip and adapted to pass between said sheaves, substantially as described.

In testimony whereof I have hereunto set my hand this 10th day of November, 1886.

EUGENE O. McGLAUFLIN.

In presence of—
A. C. PAUL,
A. M. GASKELL.